(12) United States Patent
Merchant

(10) Patent No.: US 7,542,090 B1
(45) Date of Patent: Jun. 2, 2009

(54) SYSTEM AND METHOD FOR HIGH-RESOLUTION WITH A SMALL-FORMAT FOCAL-PLANE ARRAY USING SPATIAL MODULATION

(75) Inventor: John Merchant, Needham, MA (US)

(73) Assignee: Aerodyne Research, Inc., Billercia, MA (US)

( * ) Notice: Subject to any disclaimer, the term of this patent is extended or adjusted under 35 U.S.C. 154(b) by 901 days.

(21) Appl. No.: 10/806,349

(22) Filed: Mar. 22, 2004

Related U.S. Application Data

(60) Provisional application No. 60/456,836, filed on Mar. 21, 2003.

(51) Int. Cl.
H04N 5/235 (2006.01)
H04N 5/225 (2006.01)
G03B 17/10 (2006.01)
G02B 27/10 (2006.01)

(52) U.S. Cl. .................. 348/362; 348/335; 348/343; 359/618

(58) Field of Classification Search .............. 348/362, 348/352, 144, 335, 343; 250/203.6, 203.7; 359/618, 619
See application file for complete search history.

(56) References Cited

U.S. PATENT DOCUMENTS 3,979,585 A * 9/1976 O'Meara ................ 250/201.9
4,241,996 A * 12/1980 Weiser .................... 356/126
5,943,170 A * 8/1999 Inbar et al. ............... 382/211
6,507,441 B1 * 1/2003 Eisenberg et al. .......... 359/627
6,639,626 B1 * 10/2003 Kubo et al. ............... 348/335

OTHER PUBLICATIONS

Merchant, J. and R. Fedors, "The Spatial Modulation Staring Sensor", Proceedings of IRIS Specialty Group on Passive Sensor, Mar. 3-7, 1997.

Merchant, J., "Spatial Modulation Infrared Staring Sensor", Air Force Rome Laboratory Technical Report No. RL-TR-97-74, Apr. 1997.

Merchant, J., F.J. Iannarilli, S.H. Jones and H.E. Scott, "Staring IR Spatial Modulation Sensor (SIRSMS): Large-Format Performance from Small-Format IR Focal Plane Arrays", Proc. Military Sensing Symposia Specialty Group on Passive Sensors, 2003.

(Continued)

Primary Examiner—Nhan T Tran
(74) Attorney, Agent, or Firm—Cesari and McKenna LLP

(57) ABSTRACT

This invention provides a system and method for balanced-demodulation procedures that remove image clutter even in the presence of scene motion. A system that employs balanced demodulation moves a chopping reticle located in the intermediate focal plane where front end optics focus a high-resolution image. The chopping reticle has a checkerboard pattern of clear and opaque cells and moves in an uneven rate (e.g. $\Delta x \neq \Delta y$) along the x-axis and y-axis. The resulting image is projected on a focal plane array from which differences are calculated to generate the desired balanced demodulation value. This invention further provides a foveal enhancement of the baseline spatial-modulation staring sensor. In this enhancement the WFOV low-resolution conventional image is displayed to the operator, but with a selectable subarea of that image replaced by a conventionally generated high-resolution image at the same scale. The operator would be able to naturally select the region for foveal enhancement by simply pointing directly at the detail of special interest which would then be displayed to the user at high-resolution. The remainder of the scene would be displayed at low-resolution, typically with marks at the locations of point sources detected by the spatial modulation.

21 Claims, 5 Drawing Sheets

OTHER PUBLICATIONS

Petersen, K.E., "Mocromechanical Light Modulator Array Fabricated on Silicon", Appl. Phys. Lett. vol. 31, 521, 1977.

Hornbech, L.J., "Deformable-Mirror Spatial Light Modulators", Proceedings of SPIE vol. 1150, 1989.

Warde, C. et al., "Membrane Mirror Light Modulator Technology", Proceedings of SPIE vol. 3951, 2000.

Patent Disclosure, "Spatial Modulation Staring Sensor", May 1, 1997.

Flannarilli, H. Scott, Presentation: "Effectiveness Demonstrated with SIRSMS Brassboard Sensor", presented on Mar. 22, 2002 at the BMD Passive EO/IR Sensing Workshop.

Merchant, J., "Spatial Modulation Sensor: More Pixels for Free", Prepared for MDA Passive EO/IR Workshop, Mar. 20-22, 2002.

* cited by examiner

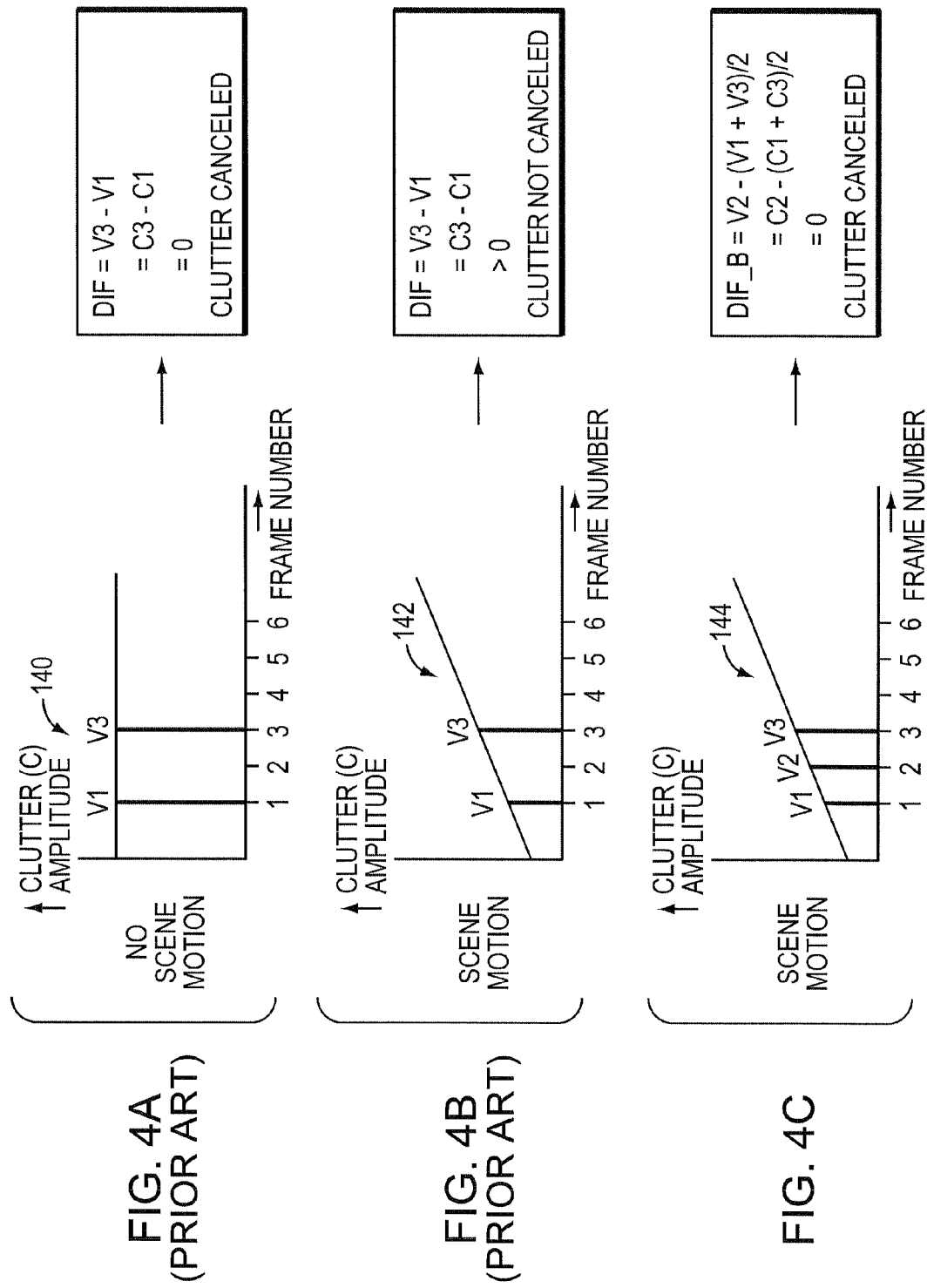

SYSTEM AND METHOD FOR HIGH-RESOLUTION WITH A SMALL-FORMAT FOCAL-PLANE ARRAY USING SPATIAL MODULATION

CROSS-REFERENCE TO RELATED APPLICATION

The present application claims the benefit of U.S. Provisional Patent Application Ser. No. 60/456,836, which was filed on Mar. 21, 2003 by John Merchant for HIGH-RESOLUTION IMAGING WITH A SMALL-FORMAT FOCAL-PLANE ARRAY USING SPATIAL MODULATION, and is hereby incorporated by reference.

STATEMENT REGARDING FEDERALLY SUPPORTED RESEARCH OR DEVELOPMENT

This invention was made with government support under Air Force Contract No. F33615-99-C-1422. The government has certain rights in this invention.

BACKGROUND OF THE INVENTION

1. Field of the Invention

This invention relates generally to the detection of unresolved point targets in clutter using a Spatial Modulation staring array image sensor that could incorporate Foveal Enhanced Imaging.

2. Background Information

Detection of unresolved point targets in clutter using an imaging electro optical (EO) or infrared (IR) sensor is required by many military and civilian system applications—for example, a missile threat warning (to protect aircraft from air-to-air and ground-to-air missiles), infrared search and track (IRST), long-range ballistic missile early launch detection, as well as security/surveillance applications in perimeter control, port security, and airport security. The fundamental detection problem in all of these systems is the identification of a point target against a background of sensor noise and scene clutter. In many cases detection is clutter-limited, not noise-limited.

It is well known that to achieve a high target-to-clutter ratio, a high-resolution imaging sensor should be used. The power spectral density (PSD) of clutter typically falls off rapidly with increasing spatial frequency, whereas the PSD of a point target remains constant up to the highest spatial frequency passed by the sensor. The target-to-clutter ratio, therefore, generally increases with increasing spatial frequency. A high-resolution imaging sensor provides access to high spatial frequencies, thereby enabling a high target-to-clutter ratio to be realized.

The resolution of an imaging sensor is bounded by the angular subtense of an array detector element, employed in the sensor. Providing the high-resolution (e.g., 1 milliradian (mr)) necessary for a high target-to-clutter ratio can be a particularly significant problem when this high-resolution must be provided continually over a wide field of view (WFOV) (e.g., 1.5 r) that is often required. This problem is quantified by the large number of pixels involved. (E.g., 1,500×1,500 pixels for 1 mr resolution over a 1.5 radians (r) field of view (FOV)).

There are three basic types of imaging sensors that can be used for the detection of unresolved point targets: scanning, conventional staring, and Spatial Modulation staring. Each of these sensor types takes a different approach to the fundamental problem of sensing and processing a large number of pixels over the FOV.

In a scanning sensor, a single detector element or a small array of detector elements is scanned, opto-mechanically, over the required FOV. The detector array in a scanning sensor will have many fewer elements (e.g., 10×10) than there are pixels over the FOV (e.g., 1,500×1,500). However, the scanning sensor is undesirable in many applications because of the cost and complexity of opto-mechanical scanning systems, and also because any particular point in the scene is sensed only periodically, and briefly, as the small detector array is repetitively scanned over the scene in a sweeping motion. For these and other reasons a staring sensor is employed in many applications.

In a conventional staring sensor the entire FOV is imaged at one time onto a focal plane array (FPA) of discrete detector elements. Each detector element generates a picture element, or "pixel," in the output image that is read out electronically from the FPA at a certain frame rate. The conventional staring sensor senses the large number of pixels over the object scene by employing an FPA that has the same large number of detector elements. A limitation of the conventional staring sensor is the relatively small format (e.g., 256×256) of affordable, or even available, FPAs. A conventional staring sensor with a small-format FPA cannot provide the high-resolution necessary for high-target-to-clutter detection over a WFOV.

An additional limitation of the conventional staring sensor is the high processing load required to process the large number of pixels. A very processing-intensive high-pass spatial-filtering operation, or its equivalent, must be performed on the output images from the detector FPA. This operation is needed to access the high-end of the spatial frequency spectrum where the target-to-clutter ratio is highest. The higher the resolution of the sensor, not only the higher the number of pixels per frame to process, but also the higher the necessary FPA frame rate to avoid motion smear in a dynamic environment. Additionally, very processing-intensive temporal-filtering operations (such as track-before-detect) may be required to achieve maximum detection sensitivity when the resolution and frame rate are both high.

The spatial-modulation staring sensor is a new type of staring sensor for point-target detection in clutter. It is able to effectively sense a large number of pixels over the object scene using a detector FPA that has many fewer detector elements. High-performance point-target detection in clutter (e.g., with 1,500×1,500 pixels over the object scene) can thereby be implemented using an affordable and available small-format detector FPA (e.g., 256×256). Moreover, no spatial filtering of the detector FPA output is required, and temporal filtering can be effected by simple frame averaging because of the low pixel-to-subtense density of the output image from the FPA.

FIG. 1 is a schematic diagram of a spatial-modulation staring sensor. A high-resolution image 10 of the object scene is formed by high-resolution front-end optics 20. This image is formed over a chopping reticle 30 located at an intermediate focal plane 40. The reticle 30 is a uniform checkerboard pattern of transparent and opaque cells. The edges of the checkerboard cells define a set of rectangular x, y coordinate axes. Typically, the size of each cell is approximately the same as that of the point-spread function (PSF) of the front-end optics.

The input high-resolution image is multiplied, i.e., spatially modulated, by the reticle pattern. The checkerboard pattern can be characterized mathematically by a spatial function that has the value "1" over a clear checkerboard cell and the value "0" over an opaque cell. The modulated (reticle-modified) image appearing at the back surface of the reticle 30 is then re-imaged by relay optics 50 onto the detector FPA 60. There are approximately SMF×SMF as many checkerboard cells covering that image as there are detector elements in the FPA, where SMF is a design parameter (e.g., SMF=6). As FIG. 2 illustrates, that is, a subarray 70 of SMF×SMF checkerboard cells (clear 76 and opaque 78) is imaged onto each detector element 80 in the FPA 60.

The reticle 30 is moved steadily in a linear motion along a fixed direction transverse to the intermediate focal plane. An actuator (not shown, but represented by multi-dimension arrows 37) is employed to move the reticle within a fixed line along a two-dimensional plane of movement. This fixed direction is inclined to the rectangular axes (x, y) so that, for example, when a point on the reticle has moved by four cell widths along one axis (e.g., the x axis) it will then have moved by one cell width along the other axis (e.g., they axis). The reticle speed is such that it moves 0.5-cell width along one axis (e.g., x) and 0.125 cell width along the other axis (e.g., y) during each FPA frame period.

If a point target is present in a static scene the image of that target on the reticle 30 will sometimes fall over a clear reticle cell, sometimes over an opaque cell and sometimes between an opaque and clear cell. Because the checkerboard reticle is moved at 0.5 cell width per frame a target that falls over a clear cell in frame n will fall mostly over an opaque cell in frame n+2. In that case the target signal can be recovered, and the clutter cancelled, by subtracting frame n from frame n+2. In the general case it can be shown that the target signal can be recovered no matter where its image falls over the checkerboard reticle by similarly processing a sequence of eight frames.

As FIG. 3 indicates, processing circuitry 72 receives the sequence of raw output frames from the detector FPA 60. Those frames can be symbolized as $V_n(x,y)$, where n is the frame number and (x,y) are the coordinates of a detector element or output pixel. The processing circuitry 72 demodulates this sequence of frames in the following manner to derive a sequence of spatial-modulation output frames $VV_n(x,y)$ in which clutter is strongly attenuated but a point target is not:

$$VV_8(x, y) = \sqrt{\begin{array}{c} [V_1(x, y) - V_3(x, y)]^2 + [V_2(x, y) - V_4(x, y)]^2 + \\ [V_5(x, y) - V_7(x, y)]^2 + [V_6(x, y) - V_8(x, y)]^2 \end{array}}$$

The signal from a point target is preserved by this frame-differencing action because the target image on the reticle is localized to a cell, and the moving reticle pattern effectively complements after every other frame. The target signal will thus appear in one or more of the four difference images $V_1-V_3, V_2-V_4, V_5-V_7, V_6-V_8$, depending upon the position of the target relative to the cell pattern. It can be shown that the target signal appears in VV at approximately its full amplitude no matter where the target falls over the reticle pattern.

However, the background clutter is virtually canceled by this same differencing action. This is because the clutter is not localized to a cell width, but extends continuously over the reticle cells. Each detector element receives the clutter signal falling over an SMF×SMF (e.g., 6×6) subarray of cells. The magnitude of this clutter signal is almost unchanged as the reticle cells complement. Thus the differencing action (e.g., $V_1-V_3$), which preserves the target signal, cancels the clutter almost to zero.

After moving some distance the reticle motion is reversed. After moving some distance in this other direction the reticle motion is again reversed, and so on. The size of the reticle is large enough so that the image of the object scene is covered by the checkerboard pattern for all positions of the reticle as it is moved forward and backward along its direction of motion.

Frame differencing, as described above, provides (in VV) a high level of background-clutter suppression while preserving the signal from a point target at almost full amplitude. In addition to the spatial-modulation output VV, a conventional output VID can be derived by frame addition. For example:

$$VID_n(x,y) = V_n(x,y) + V_{n+2}(x,y)$$

This conventional output is essentially the same as would be provided by a conventional staring sensor covering the same FOV using the same FPA.

Point targets are generally not detectable in the conventional output image VID because of its low angular resolution. Point targets can be detected in the spatial-modulation output image VV because it is derived by spatial modulation from the high-resolution optical image formed on the reticle. A detection derived from VV can be used to annotate the conventional output VID presented by, for example, a display 74 to show the position of the detected target in relation to the background scene.

Human vision is very strongly based upon true foveal imaging. A Spatial Modulation sensor with Foveal Enhanced Imaging mimics the foveal-peripheral vision of the eye, achieving high-resolution point target detection over a wide field-of-view (WFOV), using a low density (e.g. 256×256) detector array, while providing conventional high-resolution imaging over a small area, also using a low density detector array, and rapidly switching that small area within the total field-of-regard. In human vision the WFOV sensing performed by peripheral vision allows objects of any size to be detected, although not recognized. A Spatial Modulation sensor with Foveal Enhanced Imaging performs a different low density sampling than human peripheral vision and can detect only unresolved (hot spot) point targets.

SUMMARY OF THE INVENTION

Balanced Demodulation

A spatial-modulation staring sensor is able to perform point target detection with a much smaller-format focal plane array FPA than would otherwise be required. Conventionally, though, the frame rate required for it to perform effectively for rapidly moving scenes, such as those observed from a rapidly maneuvering aircraft, can impose a processing sensing and processing load that is often impractical to bear. Unless the frame rate is high, the magnitude of the residual clutter increases sharply when the clutter is moving with respect to the sensor. One approach to reduce the processing load is to employ "balanced-demodulation procedures." A system that employs balanced demodulation moves a chopping reticle located in the intermediate focal plane where front-end optics focuses a high-resolution image. The chopping reticle has a checkerboard pattern of clear and opaque cells and moves in an uneven rate (e.g. $\Delta x \neq \Delta y$) along the x-axis and y-axis. The exemplary chopping reticle has a checkerboard pattern of clear and opaque cells and moves in an uneven rate (e.g. $\Delta x \neq \Delta y$) along the x-axis and y-axis. The resulting reticle-modified image is projected on a focal plane array from which differences are calculated to generate the desired balanced demodulation value. Using such procedures in place of the types of procedures previously employed in spatial-modulation staring sensors tends to preserve a high level of clutter suppression with scene motion without requiring an excessive frame rate. An illustrative embodiment, employs such procedures in ways that implement infinite-impulse-response filtering, maximizes the use of all output frames, and, by summing absolute values rather than taking the square root of the sum of the squares, reduce the computation burden. The necessary frame rate can also be limited by basing reticle motion on target motion.

Foveal Enhanced Imaging

According to further embodiments, the basic spatial-modulation method described herein is enhanced. The baseline spatial-modulation imaging (SMI) staring sensor performs high-resolution point-target acquisition over a WFOV. It also provides a low-resolution conventional image of the scene over that WFOV. However, in some cases it is desired to provide an operator with a high-resolution view not only of point targets but also of all of the scene's spatial-frequency components. For example, six sensors, each covering a 90° FOV, could be distributed over an aircraft to detect point targets over a FOV that subtends a solid angle of $4\pi$ steradians. It could also be desired to provide an operator in that aircraft with the ability to see in any direction, at high-resolution, over such a field of view. This is sometimes referred to as a "glass cockpit."

The detection and recognition of targets over a WFOV requires high-resolution. Conventionally this high-resolution is provided by a high pixel density sensor having a correspondingly high density FPA. SMI provides the high-resolution needed for target detection, but with many fewer pixels and a correspondingly much smaller FPA. Foveal Enhanced Imaging (FEI) is a means of examining a target, detected initially by SMI as an unresolved point target (hot spot), by conventional imaging at high pixel density over a small FOV at that target. Spatial Modulation plus FEI enables targets to be detected and then examined using many fewer pixels (detector elements) than would otherwise be needed.

With basic (or pseudo) FEI the high-resolution pixel density used for narrow field of view (NFOV) imaging (for target recognition) is the same as the optical resolution used by Spatial Modulation over the WFOV. With super FEI, the NFOV high-resolution is at a higher resolution than the optical resolution used by Spatial Modulation for WFOV detection. Super FEI provides the additional resolution needed to recognize a target that was detected as a point by Spatial Modulation.

Foveation is used by human vision to very efficiently perform the two important tasks of WFOV surveillance to detect objects of interest of any size without detailed recognition capability (by peripheral vision), and NFOV conventional high-resolution imaging of an acquired region of interest or target (by foveal vision). SMI performs an analogous function to that of peripheral vision—sensing of high-resolution detail for cueing of unresolved point targets, without detailed point-by-point imaging as would be needed for recognition. Foveated SMI adds the foveal component (either as pseudo-foveation or true foveation) that allows a detected target to be examined in detail in a conventional high-resolution image of the target and/or its immediate surroundings.

The benefit of foveated SMI (or FEI) is that the total function of WFOV acquisition of an unresolved point target and NFOV recognition of the target can be performed with many fewer pixels (detector elements) than a conventional high-resolution sensor with no SMI.

An illustrative embodiment of this invention provides a foveal enhancement of the baseline spatial-modulation staring sensor. In this enhancement the WFOV low-resolution conventional image is displayed to the operator, but with a selectable subarea of that image replaced by a conventionally generated high-resolution image at the same scale. The operator would be able to naturally select the region for foveal enhancement by simply pointing directly at the detail of special interest which would then be displayed to the user at high-resolution. The remainder of the scene would be displayed at low-resolution, typically with marks at the locations of point sources detected by the spatial modulation.

BRIEF DESCRIPTION OF THE DRAWINGS

The invention description below refers to the accompanying drawings, of which:

FIG. 4A is a graph showing cancellation of clutter according to a prior art sensor implementation in the absence of scene motion;

FIG. 4B is a graph showing a failure to cancel clutter according to a prior art sensor implementation in the presence of scene motion;

FIG. 4C is a graph showing successful cancellation of clutter in the presence of scene motion using balanced demodulation according to an illustrative embodiment of this invention;

DETAILED DESCRIPTION OF ILLUSTRATIVE EMBODIMENTS

Figure 1:
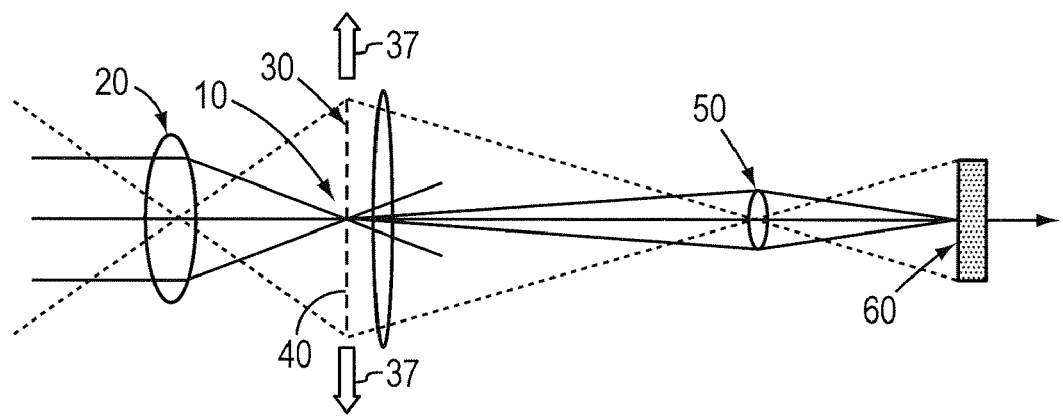
FIG. 1, already described, is schematic diagram of a spatial-modulation staring sensor system that can be used to implement the present invention's teachings.

Those skilled in the art and having the benefit of this disclosure will appreciate that the descriptions herein are by way of illustration of the principles of the invention in each case and not by way of limitation.

1. Balanced Demodulation Procedures

The function of the demodulation procedure is to derive a spatial-modulation output image VV(x,y) in which unresolved point targets are preserved at close to full intensity, whereas all other scene (i.e., clutter) detail is strongly suppressed.

With the previously referenced baseline procedure, clutter is strongly suppressed when the clutter is not moving relative to the sensor. However, the level of the residual clutter increases sharply as a function of relative scene motion. I have recognized that a high level of clutter suppression can be achieved despite a certain degree of scene motion if one employs a so-termed "balanced demodulation procedure."

As described above, a previously used type of demodulation function is given by:

$$VV_8(x,y) = \sqrt{\frac{[V_1(x,y)-V_3(x,y)]^2 + [V_2(x,y)-V_4(x,y)]^2 +}{[V_5(x,y)-V_7(x,y)]^2 + [V_6(x,y)-V_8(x,y)]^2}}$$

where $V_r$ is the output frame from the FPA on frame number r and VV is the demodulated spatial-modulation output frame derived from detector frames 1, 2, ..., 8.

In contrast, one version of a "balanced demodulation function" is given by:

$$VV = \sqrt{\left(V_2 - \frac{V_1+V_3}{2}\right)^2 + \left(V_3 - \frac{V_2+V_4}{2}\right)^2 + \left(V_6 - \frac{V_5+V_7}{2}\right)^2 + \left(V_7 - \frac{V_6+V_8}{2}\right)^2} \quad (1)$$

This is a one-frame-delay version. Another example version is a two-frame-delay version:

$$VV = \sqrt{\left(V_3 - \frac{V_1+V_5}{2}\right)^2 + \left(V_4 - \frac{V_2+V_6}{2}\right)^2 + \left(V_7 - \frac{V_5+V_9}{2}\right)^2 + \left(V_8 - \frac{V_6+V_{10}}{2}\right)^2} \quad (2)$$

where $V_r$ is the output frame from the FPA on frame number r and VV is the demodulated output frame derived from detector frames.

One of these three demodulation procedures can be selected according to the known or expected motion environment in order to maximize the degree of clutter suppression. The choice may be made in accordance with the following selection table, for instance:

| Motion: | Demodulation Procedure: |
|---|---|
| No motion | Baseline |
| 0-0.25 cell width/frame | Balanced (One-Frame Delay) |
| 0.25-0.5 cell width/frame | Balanced (Two-frame delay) |

The cell width is the angular subtense of a cell in the checkerboard reticle. For example, if the reticle has 1,500×1,500 cells and covers a 90-degree FOV, the angular width of each cell is about 0.06°. If the detector frame rate is 1000 fps, then (for example) 0.5 cell-width/frame corresponds to a target angular rate of 30°/sec.

As explained above, the target signal is recovered by taking differences between every other frame (e.g., $V_1-V_3$). This differencing cancels the background and recovers the reticle-induced sinusoidal temporal modulation of the target signal. In the simple one-dimensional case, the target amplitude is recovered (independent of time t) by taking the sum of squares of successive differences (e.g. $(V_1-V_3)^2+(V_2-V_4)^2+\ldots$).

It can be shown that in the general two-dimensional case the target signal is recovered by taking the sum of squares of four differences:

$$VV_8(x,y) = \sqrt{\frac{[V_1(x,y)-V_3(x,y)]^2 + [V_2(x,y)-V_4(x,y)]^2 +}{[V_5(x,y)-V_7(x,y)]^2 + [V_6(x,y)-V_8(x,y)]^2}}$$

This is the baseline spatial-modulation demodulation procedure. But a less computation-intensive approach, both for the baseline procedure and the balanced-modulation procedure, is to take the sum of absolute values rather than the square root of the sum of the squares. An example of this approach for the baseline procedure is given by the following formula, which also implements it as an infinite-impulse-response filter rather than a finite-impulse-response filter:

$$VV_n(x,y)=k*VV_{n-1}(x,y)+(1-k)*|V_n(x,y)-V_{n+2}(x,y)|, n>1$$

$$VV_1(x,y)=|V_1(x,y)-V_3(x,y)|,$$

where k is a parameter such that 0<k<1 and determines the time constant for the exponential averaging that the infinite-impulse-response filter implements.

A similar approach to the balanced-demodulation procedure can be taken, for example, for one-frame and two-frame delays. For a one-frame delay, the following formula could be used:

$$VV_n(x,y)=k*VV_{n-1}(x,y)+(1-k)*|V_{n+1}(x,y)-[V_n(x,y)+V_{n+2}(x,y)]/2|, n>1$$

$$VV_1(x,y)=|V_2(x,y)-[V_1(x,y)+V_3(x,y)]/2|$$

Here is the corresponding formula for a two-frame delay:

$$VV_n(x,y)=k*VV_{n-1}(x,y)+(1-k)*|V_{n+2}(x,y)-[V_n(x,y)+V_{n+4}(x,y)]/2|, n>1$$

$$VV_1(x,y)=|V_3(x,y)-[V_1(x,y)+V_5(x,y)]/2|.$$

It may be noted that this preferred means of deriving the spatial-modulation output image $VV_n$ incorporates a number of important features.

First, it is the modulus, not the square, that is taken of every difference (e.g., $V_1-V_3$). In the accumulation of the differences (to form VV) the square root is not taken. It can be shown that this implementation derives the target signal at almost the same amplitude as by taking the square root of the sum of squares. However this preferred implementation is computationally more efficient by its elimination of the squaring and square root operations.

Second, since it results from the action of an infinite impulse response (IIR) filter, the spatial-modulation output VV is an accumulation of the differences (e.g., $V_1-V_3$) over time. Being an exponential average, the output VV approximates an average of the differences (e.g., $V_1-V_3$) over a number of frames. Temporal filtering is necessary in many cases because the time response desired in the spatial-modulation output is much longer than the FPA frame period. The IIR filter provides the required output time response while improving signal-to-noise by temporal averaging. The temporal filtering action is performed efficiently and easily on each frame difference as it is developed, and not on the root mean square of four differences as implied in the mathematical baseline derivation.

Finally, the accumulation is taken of all frame differences. In the baseline procedure only half of the available differences are taken. For example: $V_1-V_3, V_2-V_4, V_5-V_7, V_6-V_8$ are taken, but $V_3-V_5, V_4-V_6, V_7-V_9, V_8-V_{10}$ are not.

To further assist the reader in understanding the principles of balanced demodulation, reference is made to FIGS. 4A-4C which show three graphs 140, 142 and 144, respectively of clutter amplitude C versus frame number. As stated above, the function of a Spatial Modulation staring sensor (as shown in FIG. 1) is to detect unresolved hot spot point targets in clutter using a much lower resolution detector array (e.g. 256×256) than would otherwise be required by a conventional staring sensor (e.g. 1,500×1,500). In the Spatial Modulation sensor, a series of consecutive frames V1, V2, V3, is generated by the low-resolution detector array (60 in FIG. 1). The Spatial Modulation sensor function is performed, essentially, by frame-subtraction.

The basic principle of this frame subtraction process can be understood by considering two almost identical output image frames (V1, V3) from the detector array. By the action of the moving reticle (30 in FIG. 1) a point target that is present in one output frame (V1) will not appear in the other frame (V3). These frames (V1, V3) can be subtracted to form a difference-frame DIF. (DIF=V3-V1). Because the point target is present in only one of these two frames, it is preserved at full amplitude in the difference frame (DIF). If the sensor is not moving relative to the scene (graph 140 in FIG. 4A), all other scene detail (i.e. background clutter), being almost the same between the two frames (V1, V3), is canceled almost to zero in DIF. The point target can then be readily detected in the difference frame DIF because of the very strong attenuation of all background clutter.

However if the sensor is moving relative to the scene (graph 142 in FIG. 4B), the clutter will have moved between the taking of the two frames. In that case the frames V1 and V3 and will then no longer be almost exactly the same.

Balanced demodulation is a mechanism for compensating for the effect of scene motion so that the clutter can still be subtracted almost to zero. Reference is now made to FIG. 4C, which shows the results of balanced demodulation according to the illustrative embodiment. With one-frame-delay balanced demodulation the difference (DIF_B) is formed as DIF_B=V2-(V1+V3)/2.

If (because of scene motion) the clutter intensity in any particular output detector is different in frames V1 and V3, causing clutter leakage in the simple difference DIF=V1-V3, then this clutter leakage is reduced or attenuated in the balanced demodulation difference DIF_B=V2-(V1+V3)/2.

For example, assume that, because of scene motion, the output from one particular detector element is 12 units in frame V1, 11 units in frame V2 and 10 units in frame V3. In that case, DIF=V1-V3=12-10=2 units, whereas DIF_B=V2-(V1+V3)/2=11-(10+12)/2=0. That is, the clutter leakage of 2 units (with prior art demodulation) has been reduced to 0 by balanced demodulation.

The target intensity is also reduced by one-frame balanced demodulation but less so. The reticle moves one-half cell per frame. That is, it takes two frames for the reticle to block the target. Thus if the nominal target intensity is 100% in frame V2, then it will be 50% in frames V1, V3, and therefore 50% in DIF_B. Because of the large clutter leakage that can be caused by scene motion the net effect of balanced demodulation with one frame delay is maintenance of a strong target-to-clutter ratio with scene motion.

With balanced demodulation with two-frame delay the basic difference DIF_BB is formed as DIFF_BB=V3-(V1+V4)/2.

If the nominal target intensity is 100% in frame V3 then it will be 0% in frames V1, V4, and thus nominally 100% in DIF_BB. That is, nominally there is no reduction of target signal with balanced demodulation with two-frame delay.

Figure 2:
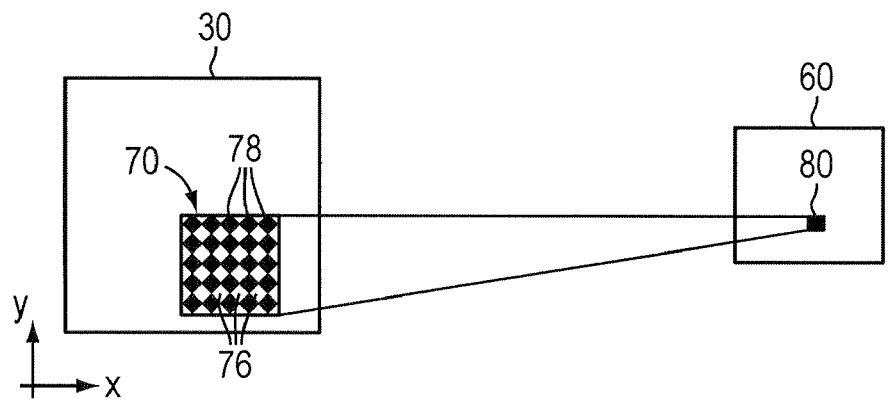
FIG. 2, already described, is a diagram showing the relationship between reticle cells and array elements.
Figure 3:
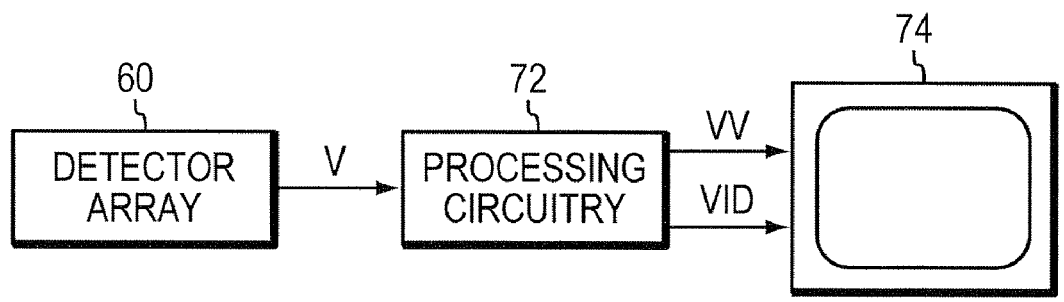
FIG. 3, already described is a block diagram showing a processing train for processing the detector array output of FIG. 2 into detection results.

The point target is made to appear in one frame (e.g. V1) but not the other (e.g. V3) by the action of a checkerboard reticle (30 in FIG. 1) consisting of alternately clear and opaque cells. A high-resolution optical image (10 in FIG. 1) of the scene is formed over this reticle which is located within the sensor at an intermediate focal plane (40 in FIG. 1) and which is moved steadily over the image at a rate of one half checkerboard-cell width per frame. After passing through, and being modulated (multiplied) by the reticle, the scene image is relayed to a lower resolution detector array (80 in FIG. 2). Suppose that, when frame V1 is taken, the point target falls within a clear checkerboard cell (76). Then when frame V3 is taken the reticle has moved so that it falls over an opaque cell. In that case the point target does not appear in frame V3.

2. Improved Moving Target Detection

The moving reticle in the Spatial Modulation sensor causes the FPA output signal from a point target to be temporally modulated over a sequence of consecutive frames. The temporal frequency □ of this modulation is proportional to the reticle spatial frequency. The amplitude T of this modulation corresponds to the target signal. The demodulation procedure separates this modulation from the DC background by differencing between every other frame—that is, over a phase of 180°—and then recovering the modulation amplitude (MODAMP) by summing the square (or modulus) of these differences over multiple frames. (The phase difference per frame is 90°):

$$\text{OUTPUT}(t)=DC+T\sin \omega t \quad (3)$$

$$\text{DIFFERENCE}(t)=DC+T\sin(\omega t+\pi)-(DC+T\sin \omega t)=-2T\sin \omega t \quad (4)$$

$$\text{MODAMP}=2T\sqrt{\sin^2\omega t+\sin^2(\omega t+\pi/2)}$$

$$=2T\sqrt{\sin^2\omega t+\cos^2(\omega t+\pi/2)}(5)=2T \quad (5)$$

For simplicity of explanation, the target and reticle motions are assumed here to be in one (x) direction only. The same principle applies to the general case of x and y motions.

When the bearing of a point target is stationary relative to the spatial-modulation sensor, the demodulated target signal is maximized when the reticle speed is 0.5-cell width/frame in x and 0.125-cell width/frame in y. Target motion changes the modulation frequency so that the differencing is no longer over 180°, and the amplitude of the difference is then correspondingly decreased. That is, the output target signal is decreased. Target signal is also reduced by motion smearing of the target image.

In many cases of target motion, the motion of the target is known or at least approximately known: for example, a target seen from an aircraft that is executing a roll. The roll motion of the aircraft causes relative target motion at the same angular rate, but the roll motion of the aircraft can generally be sensed by devices on the aircraft. The measured aircraft roll motion can be applied to the Spatial Modulation sensor to negate the effect of that motion.

For angular rates of target motion up to 0.5 cell width/frame the effect of target motion can be negated by changing the reticle speed so that the motion of the target over the reticle is restored to its design value of 0.5 cell width per frame in x, and 0.125 cell width/frame in y. For example, suppose it is known that the relative target motion is equivalent to 0.2 cell width in the forward direction of the reticle. In that case, to compensate for this motion the forward speed of the reticle would be reduced to 0.3 cell width/frame and the reverse speed increased to 0.7 cell width per frame. With this pattern of reticle speeds the relative motion of the target over the reticle would be restored to 0.5 cell width/frame in both the forward and reverse directions. That is, the target signal would be preserved at full amplitude in spite of the target motion.

For target motion at angular rates above 0.5-cell width per frame, this target-motion compensation can be applied only in one (forward) direction of the reticle motion. In this case the reticle should be moved as quickly as possible in the other (backward) direction and no target information is derived. Target information is derived with full target motion compensation when the reticle is moving at its compensated speed in the forward direction. Although target information is not available at all times for target motions greater than 0.5 cell width/frame, the duty cycle will never be less than 50%. Since the raw demodulation procedure output will generally be temporally filtered (e.g., by an IIR filter), the effect of this duty cycle will generally be a loss of target signal (of no more than 50%) rather than a temporal interruption of signal.

For scene angular rates above 0.5 cell-width/frame, clutter suppression is degraded. However, with this magnitude of motion the clutter itself will be degraded by motion smearing, thereby partially offsetting the reduced degree of clutter suppression. Thus target motion compensation for scene motions above 0.5 cell-width/degree may often provide useful target detection capability under conditions in which the target might be severely degraded by motion smearing. The compensated reticle speed effectively stabilizes the sensor against the motion of the target.

3. Reticle-Design Tolerances

Simulation studies have shown that random cell-to-cell variations of as much as 1% in the transmission of reticle clear cells are acceptable. Such reticle variations typically increase the standard deviation of the residual clutter by no more than about 20%. Likewise the variation in area between cells is no more than 1% in an illustrative embodiment and the opaque cells are considered 100% or "perfectly" opaque in the spectral wavelength of interest (IR in this example). The reticle can be manufactured in this manner using conventional deposition, etching and photolithography processes.

4. Back-End Optics

The spatial-modulation optical system extends continuously from the front-end objective to the back-end optics (50 in FIG. 1) that forms the final image on the FPA. We have determined that imposing a design constraint on this optical system over and above those of the baseline system will result in optimized performance.

As was explained above, a high-angular-resolution image of the object scene is formed on the front (input) surface of the reticle. The diameter of the PSF of the front-end optics must be of the order of the reticle-cell width. Achieving high front-end resolution is very important because it directly impacts the amplitude of the modulation of the target signal induced by the reticle motion. That modulation provides the means for detection of the target. The optical system should therefore be designed, manufactured, and tested to provide the specified high-resolution of the front-end optics Considerations are different at the FPA plane. In relaying the reticle image onto the detector FPA, the lateral demagnification of the back-end optics is made equal to the ratio of SMF×reticle cell width to detector pixel pitch. From this baseline-system feature—i.e., this imaging of a plurality of reticle cells onto a single detector pixel—one might infer that it would be acceptable for the back-end optical system not to completely resolve each reticle cell on the FPA plane.

And this is in fact true; it is not only acceptable but also preferable. Specifically, the performance is optimized if, for a PSF centered on an FPA element, not more than 50% of the PSF's energy falls within the central 25% of the element's area. Simulation has shown that the blurring of the high-resolution reticle pattern onto the FPA plays an important role in the minimization of artifacts such as the spatial variation in sensitivity over the surface of each detector element. Also because of this blurring, each detector element is effectively covered equally by clear and opaque cells whether SMF is odd or even. (With high-resolution back-end optics and an SMF of 5, a detector would be covered sometimes by twelve clear cells (76 in FIG. 2) and sometimes by thirteen. This would result in an extraneous modulation in the output from the FPA.)

Of course, it is, in most cases, desirable to retain the full FPA resolution, so at least 50% of the PSF's energy should fall on the FPA element.

5. Foveal Enhancement

The spatial-modulation staring sensor allows high-performance point-target detection in clutter to be performed over a WFOV (e.g., 90°) using a small-format FPA. For example, detection performance comparable to that of a conventional staring sensor with a 1,500×1,500 FPA can be achieved using only a 256×256 FPA. The baseline spatial-modulation staring sensor also provides a conventional low-resolution output WFOV image (e.g. 256×256) that can be used by an operator to view the entire scene at low-resolution. However, even though the resolution provided by the FPA is low, a high-resolution image is formed over the chopping reticle. Foveal enhancement provides a means of accessing that high-resolution image to provide the operator with a conventional high-resolution output image of any designated subarea of the scene. The high-resolution image of the subarea can be detected either with a second small-format FPA (e.g. 256× 256), or by sharing the original small-format FPA.

The conventional low-resolution WFOV output image from the baseline spatial-modulation staring sensor can be combined with the Foveal Enhanced high-resolution image of a selected area. This combination provides the user with a continuous image of the entire WFOV scene, all at the same scale, but with a designated region of interest shown at high-resolution. This combined image might, for example, be formed on the screen of a user's helmet mounted display (HMD) with a helmet direction sensor. In this case the designated (Foveal Enhanced) high-resolution area (e.g. 15°× 15°) would always be shown at the center of the display, and the surrounding area of the display (e.g., up to 45°×45°) would be covered with a contiguous low-resolution image of the scene at the same scale. The operator would designate the position of the desired high-resolution area of the scene by aiming his or her head in that direction. The measurement of helmet direction would be used to designate the desired scene area. The Foveal Enhanced view (e.g. 15°×15°) would allow the operator using the HMD to view the region of interest in the scene at high-resolution while the contiguous low-resolution background view (e.g., out to 45°×45°) would show the overall scene context. In this way the operator would be able to dynamically view a wide area scene very much as he or she would by naked eye vision. (Naked eye vision provides clarity only over a small central (foveal) area. The lower resolution peripheral vision is very important in providing context and orientation).

Figure 5:
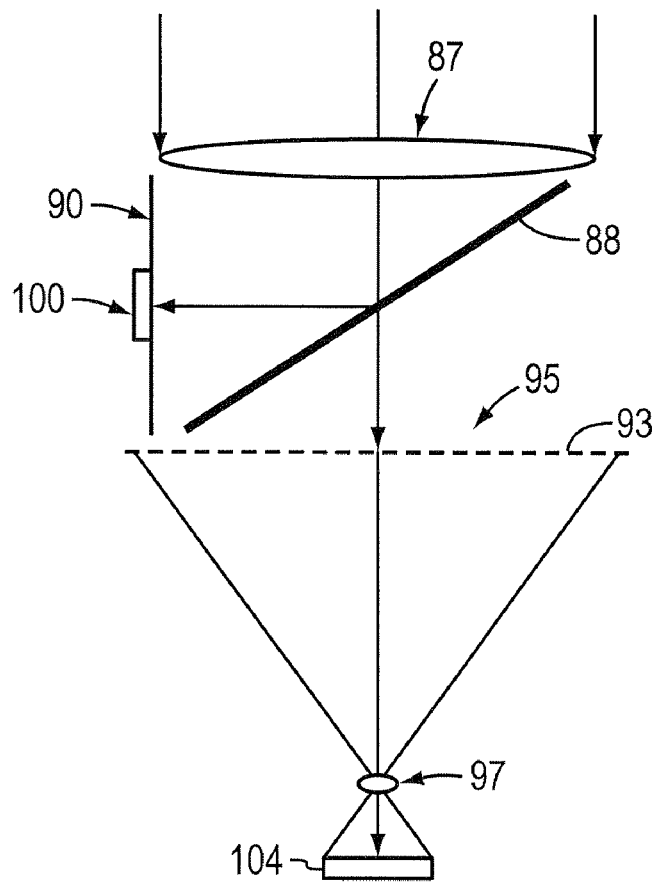
FIG. 5 is a schematic diagram showing an embodiment of the present invention, which employs foveal enhancement.

FIG. 5 shows one implementation of foveal enhancement that may be incorporated into a version of the baseline sensor shown in FIG. 1. A slewable beam splitter 88 diverts some of the high-resolution (e.g. 1 mr PSF) incoming radiation from the front-end optics 87 onto a second intermediate focal plane 90. A second small-format FPA 100 (e.g. 256×256) is located on that second focal plane 90. It may be essentially identical to the primary FPA 104, but the size of the image in its plane is larger than that of the (demagnified) image in the primary FPA's plane, so it covers a relatively small subarea (e.g., 15°) and thereby affords relatively fine angular resolution (e.g., 1 milliradian (mr)). The reticle 93 is a moving/chopping reticle of the type described generally above (reticle 30, for example). It is aligned on the primary intermediate focal plane 95. It transmits the image through the back-end optics 97, and whence, to the primary FPA 100.

Figure 6:
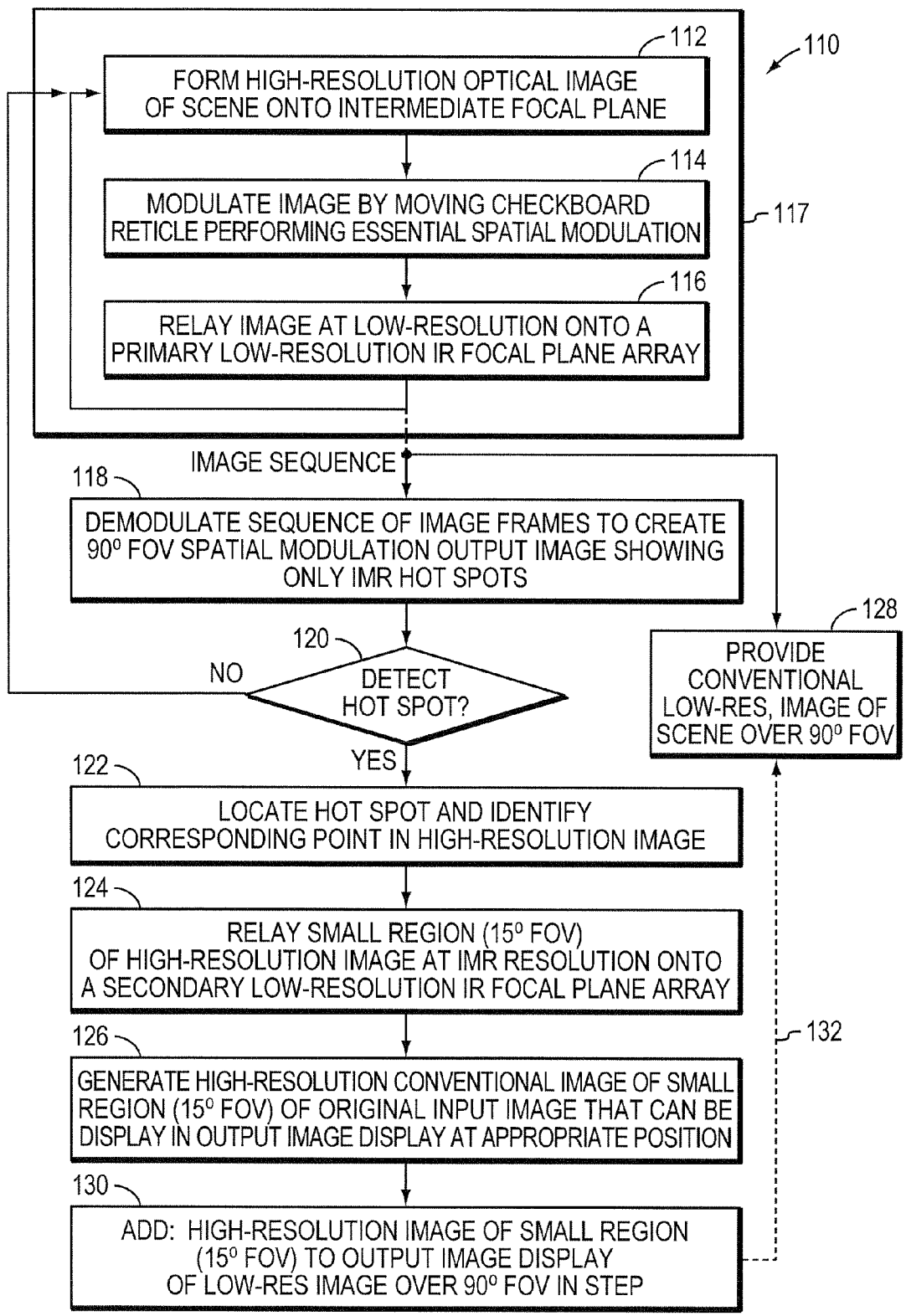
FIG. 6 is a flow diagram of a foveal enhancement procedure according to an illustrative embodiment of this invention.

The secondary FPA's (100) output, which is an image of the subarea generated conventionally, without the reticle's modulation, is used for the foveal area. The low-resolution VID output of the primary FPA 104 is used for the peripheral area, and it can be marked with the point-source outputs from that FPA's VV output. Note that the above-described processing circuitry is adapted to receive the input of the secondary FPA 100, and perform the foveal enhancement procedure 110 that is now described with reference to the flow diagram of FIG. 6.

In step 112, a high-resolution (1 mr IFOV) optical image of the scene is formed (over a 90° FOV) onto an intermediate focal plane 95. In step 114, this image is modulated by a moving checkerboard reticle 93 that performs the essential Spatial Modulation action described above. After modulation by the reticle 93, the 90° FOV image is relayed at low-resolution onto a (primary) low-resolution (256×256) IRFPA 104 in step 116. A continuous sequence of image frames is produced in accordance with steps 112, 114 and 116 (subroutine 117). During the production, either as a batch or in a continuous manner, the low-resolution image frames from the primary FPA 104 are transmitted to the demodulator of the processing circuitry. The sequence of image frames from this primary IRFPA is demodulated (step 118) to create a 90° FOV Spatial Modulation output image that shows only 1-mr hot spots.

If and when a hot spot is detected (decision step 120) in the Spatial Modulation output image, it is located in step 122. At this time, the corresponding point of the high-resolution optical image is identified. In step 124, a small (15° FOV) region of this high-resolution optical image is then relayed, at 1 mr resolution, onto a secondary low-resolution (256×256) IRFPA 100. In step 126, this secondary IRFPA generates a high-resolution (1-mr resolution) conventional image of the selected sub area (15° FOV) of the original input image that can be displayed at the appropriate position on an output image display.

During the procedure 110, the sequence of raw image frames from the primary IRFPA 104 provides (in accordance with subroutine 117) a conventional low-resolution (6-mr) image of the scene over a 90° FOV (step 128). This 90° FOV low-resolution (6-mr) image can be displayed on the output image display (step 130 and dashed branch 132). It provides a low-resolution view of the scene detail surrounding the 15° high-resolution (1-mr) part of the display.

Hence, the above-described Foveal Enhanced imaging system procedure allows a hot spot target to be detected at high-resolution, and this target and its immediate surround can then be examined at high-resolution. This can be accomplished using either two low-resolution (256×256) IRFPAs (as shown and described), or by sharing one low-resolution IRFPA. By way of comparison, if a conventional staring sensor were used to detect and image targets, over the same 90° FOV, at the same resolution (1-mr), a much-larger 1,500× 1,500 IRFPA would typically be needed to carry out the detection at the desired resolution.

In another embodiment, the primary and secondary FPA's can be, e.g., 256×256 halves of a 256×512 array. The radiation reflected by the slewable beam splitter is relayed by conventional optics without demagnification onto half the secondary half, and the demagnified version of the image that has passed through the reticle is directed to the primary half.

In another embodiment, the beam splitter is dichroic and, for example, directs by reflection a long-wave infrared (LWIR) image onto to the secondary FPA. It would transmit a medium wave IR (MWIR) image onto the chopping reticle for WFOV point target detection.

In yet another embodiment, the spectrally selected (e.g., LWIR) Foveal Enhanced image is directed by conventional optics to the original FPA (e.g. 256×256), which in this case would be a two-color FPA. That is, this FPA provides independent outputs of the MWIR image (WFOV point target detection) and of the narrow field of view (NFOV) LWIR image.

Note that another complete set of these variations is made available when the slewable beam splitter is located below, instead of above, the reticle 93 in FIG. 4.

Figure 7:
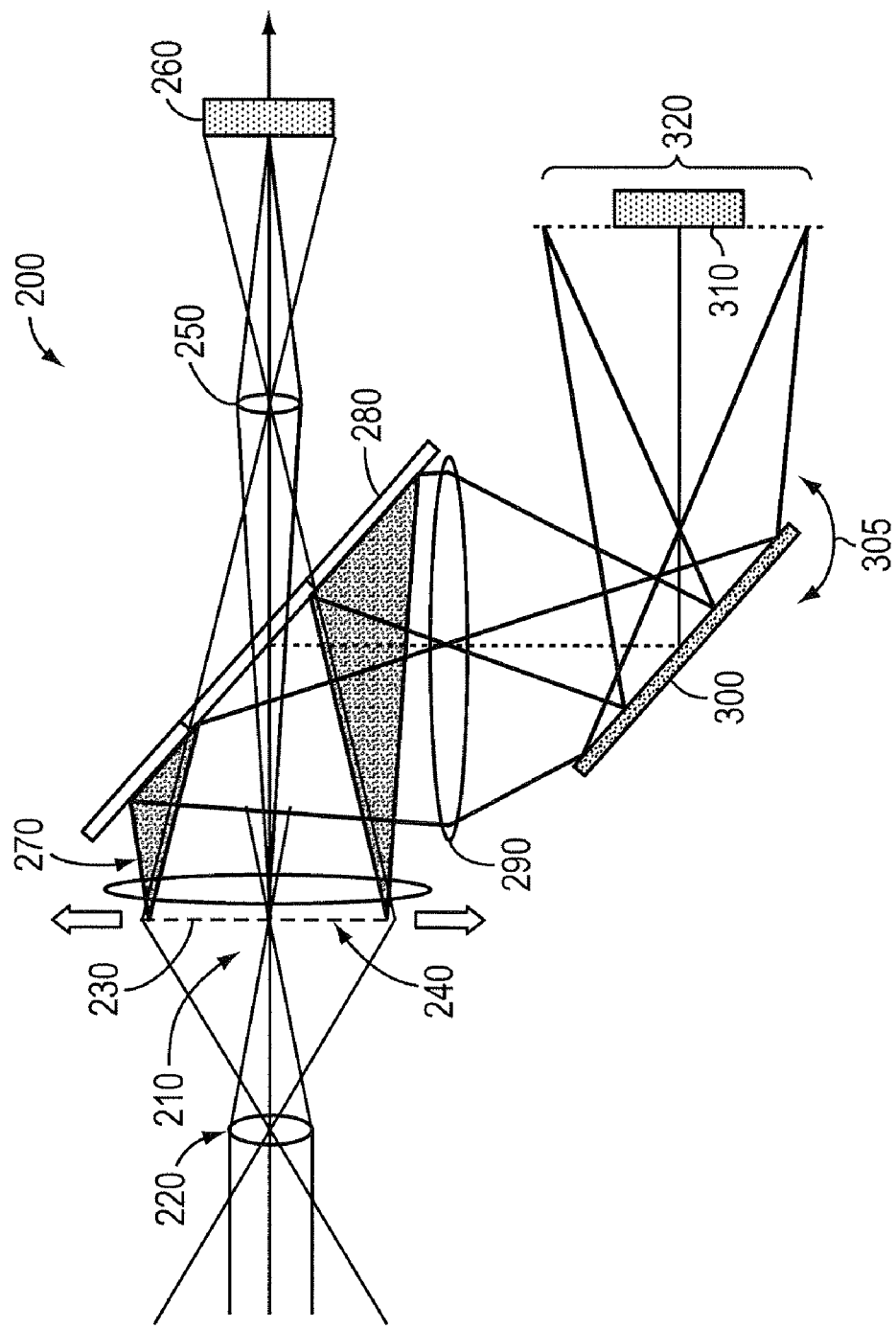
FIG. 7 is a schematic diagram showing an illustrative embodiment of the present invention that provides Foveal Enhanced imaging by capturing the spillover light in the optical transition from the high-resolution image at the reticle plane to the low-resolution conventional image at the wide-FOV spatial modulation detector.

FIG. 7 illustrates an illustrative embodiment of foveal enhancement system 200 that is uniquely tied to spatial modulation imaging (SMI) in that SMI fundamentally involves a loss of photons in the optical transition from the high-resolution image at the plane of the reticle to the relay optic for imaging onto the small-format FPA. With a little added effort and in a variety of configurations, it is possible to capture these lost photons and put them to work in the Foveal Enhanced high-resolution image without robbing light from the spatial modulation mode.

In accordance with the system 200 of FIG. 7, Foveal Enhanced imaging is employed in concert with spatial modulation. An image is received through front-end optics 220 to generate a high-resolution image 210 at the chopping reticle 230 in line with the intermediate focal plane 240. In accordance with this embodiment, particular attention is given to collecting the spillover light in the spatial modulation channel in the transition from the high-resolution image 210 at the reticle 230 to the back end or relay optic 250 that images the images the reticle 30 onto the spatial modulation primary IR focal plane array (IRFPA) 260. The full f/number cone 270 available downstream of the reticle image plane (intermediate focal plane 240) overfills the secondary aperture stop which is the image of the first aperture stop formed at the entrance to the relay optic 250. In the illustrative embodiment, this overfill is a fundamental and intended consequence of the spatial modulation technique. Throughput considerations for the spatial modulation channel from front to back lead to this conclusion. Thus the spillover light from the high-resolution image at the reticle plane can be harvested for the Foveal Enhanced imaging without negative impact on the spatial modulation channel.

With further reference to FIG. 7, the optical train for doing this consists of the beamsplitter 280, in this case a mirror or dichroic element with a hole/aperture 282 in the center to pass through the spatial modulation channel, a condensing optic 290 providing a magnification of unity or greater to carry forward the high-resolution image 210, and a slewable (represented by double arrow 305) steering mirror 300, which is controllable in both pitch and yaw, to access any region of interest (ROI) in the high-resolution scene at the small-format secondary detector array 310. The condensing optic 290 provides pseudo-foveation for M=1 and super-foveation for M>1. Note the subtense of the high-resolution image (320) exceeds the size of the affordable small-format FPA 310. In an alternate embodiment, the secondary FPA can be replaced by using a shared portion of the primary FPA 260. Foveal Enhanced imaging is enabled by and a perfect complement to the spatial modulation imaging technique.

It is noted that the drive mechanism or actuator (represented schematically, for example by arrows 37 in FIG. 1) for the reticle of any embodiment herein can be implemented using a variety of mechanical and electromechanical devices. One actuator for the reticle can be a long stroke drive mechanism to translate the reticle across the full extent of the scene image at constant velocity (0.5 cell-width per frame and up to 1200 frames per sec). Alternative the actuator can be a short stroke oscillatory drive mechanism to translate the reticle at least four cell widths (8 frames) at constant velocity (0.5 cell-width per frame and up to 1200 frames per sec) plus turn-around-and-velocity-stabilization time at each end of the stroke. Alternative the reticle can be actuated based upon an active digital device providing independent control of each cell, including micromirror arrays (as described in K. E. Petersen, "Micromechanical Light Modulator Array Fabricated on Silicon," Applied Physics. Letter vol. 31, 521, 1977), or based upon addressable membrane mirrors (as described in L. J. Hombech, "Deformable Mirror Spatial Light Modulator," Proceedings of SPIE vol. 1150, 1989 and C. Warde et. al., "Membrane Mirror Light Modulator Technology," Proceedings of SPIE vol. 3951, 2000), and/or upon pneumatic liquid crystals that achieve the equivalent light modulation rate (0.5 cell-width per frame and up to 1200 frames per sec) and cell size.

Finally, Foveal Enhanced imaging can also be implemented by a second FPA located directly on the reticle surface to intercept the high-resolution image and slewed to the desired point in the scene by the reticle drive.

The foregoing has been a detailed description of illustrative embodiments of the invention. Various modifications and additions can be made without departing form the spirit and scope thereof. For example, the arrangement of processing circuitry for handling images herein can be varied. Any or the procedures described herein can be carried out by hardware, software that includes computer-readable medium program instructions, or a combination of hardware and software. Additional optical and electro-optical components such as filters, lenses and the like can be provided to the sensor arrangements described herein where appropriate. Further, while a reticle composed of clear and opaque alternating cells in a checkerboard pattern is provided, it is expressly contemplated that any combination of transmissive and non-transmissive (or partially transmissive) cells in any pattern can be provided to form the chopping reticle. Accordingly, this description is meant to be taken only by way of example, and not to otherwise limit the scope of this invention.

What is claimed is:

1. A system for scanning a target of interest in a scene comprising:
   a high-resolution collecting optic;
   a spatial modulation reticle located in a high-resolution image plane of the collecting optic, the reticle being a temporally varying pattern in the image plane;
   a demagnifying relay optic;
   a primary small-format focal plane array (FPA) detector located in the demagnified image plane that receives reticle-modified images and outputs image frames; and
   a processor that performs, with the image frames, a balanced demodulation function that reduces image clutter by compensating for the effect of movement of the system relative to the scene, wherein the balanced demodulation function utilizes differences between image frames and averages of image frames.

2. The system as set forth in claim 1 wherein the balanced demodulation function comprises:

$$VV = \sqrt{\left(V_2 - \frac{V_1 + V_3}{2}\right)^2 + \left(V_3 - \frac{V_2 + V_4}{2}\right)^2 + \left(V_6 - \frac{V_5 + V_7}{2}\right)^2 + \left(V_7 - \frac{V_6 + V_8}{2}\right)^2}$$

in which
   $V_r$ is an output image frame from the FPA on frame number r, and
   VV is a demodulated output frame derived from a sequence of 8 image frames.

3. The system as set forth in claim 2 wherein the demodulation function is defined by a predetermined frame delay and wherein a choice of the predetermined frame delay is made according to a known or expected scene motion environment and a known angular subtense of each of a plurality of cells of the reticle so as to maximize a degree of clutter reduction.

4. The system as set forth in claim 1 wherein the processor is configured to perform enhanced detection of the target-of-interest in motion, wherein a derived motion of the target-of-interest based upon a detection scenario is used to adjust a motion of the reticle so as to generate a desired result.

5. The system as set forth in claim 4 wherein the motion is derived by monitoring pitch and roll rates of a movable support that carries each of the high-resolution collecting optic, the spatial modulation reticle, the demagnifying relay optic and the FPA detector.

6. The system as set forth in claim 1 wherein the reticle includes a plurality alternating of transmissive and non-transmissive cells and wherein a size of each of the cells is defined by a desired instantaneous field-of-view (IFOV) and matches an achievable point spread function (PSF) of the high-resolution collection optic.

7. The system as set forth in claim 6 wherein the a cell-to-cell variation in area for each of the cells with respect to all other of the cells is less than 1% and wherein each of the non-transmissive cells are 100% opaque in a spectral band of interest and wherein a transmissivity of each of the transmissive cells varies by no greater than 1% with respect to the transmissivity of all other of the transmissive cells.

8. The system as set forth in claim 1 wherein the processor is configured to identify a region of interest and direct a high resolution sensor to magnify and further examine the region of interest.

9. The system as set forth in claim 1 wherein the demagnifying relay optic directs light from the spatial modulation reticle to the FPA detector and provides:
   a lateral demagnification equal to a ratio of a spatial modulation factor (SMF) times a reticle cell width to the pixel pitch of the FPA detector, wherein the SMF is a measure of a number of cells imaged onto each element (pixel) of the FPA detector; and
   blurring of a reticle pattern onto the FPA detector such that no more than 50% of a point spread function's (PSF's) energy falls within a central 25% of an element (pixel)

area of the FPA detector, while at least 50% of the PSF's energy falls within the element (pixel) area of the FPA detector.

10. The system as set forth in claim 1 wherein the spatial modulation reticle has a fixed cell pattern of opaque and transparent cells, created by deposition, etching and photolithography processes, and the system further comprises:
a long stroke drive mechanism to translate the reticle across a full extent of the image of the scene at constant velocity.

11. The system as set forth in claim 1 wherein the spatial modulation reticle has a fixed cell pattern of opaque and transparent cells, created by deposition, etching and photolithography processes, and the system further comprises:
a short stroke oscillatory drive mechanism to translate the reticle at least four cell widths at constant velocity plus turn-around-and-velocity-stabilization time at each end of the stroke.

12. The system as set forth in claim 1 wherein the spatial modulation reticle has a fixed cell pattern of opaque and transparent cells, and the system further comprises:
an active digital device that provides independent control of each of the cells, the digital device including at least one of micromirror arrays, addressable membrane mirrors and pneumatic liquid crystals.

13. The system as set forth in claim 1 wherein lateral demagnification in the demagnifiying relay optic is equal to a ratio of a spatial modulation factor (SMF) times reticle cell width to a detector pixel pitch.

14. An apparatus for spatial modulation imaging (SMI) including a high-resolution collecting optic, a spatial modulation reticle located in a high-resolution image plane of the collecting optic, the reticle moving in the image plane, a demagnifying relay optic and a primary small-format focal plane array (FPA) detector located in the demagnified image plane, the apparatus further comprising:
a foveal enhanced imaging (FEI) mechanism having an amplitude beamsplitter located either (a) just before or (b) after the reticle moving plane, to split off a fraction of a high-resolution image intensity; and
a spectral band width or polarization component, for retaining the high-resolution image by routing it to one of either a secondary focal plane array detector or a shared portion of the primary FPA.

15. The apparatus as set forth in claim 14 further comprising an additional small-format FPA employed to output the high-resolution image of a selected subarea from the scene, an extent of the subarea being determined by a size of the additional FPA.

16. The apparatus as set forth in claim 15 further comprising a secondary optical path that leads from the beamsplitter through a 1:1 magnification optic to the additional FPA.

17. The apparatus as set forth in claim 16 wherein the additional FPA is located directly on the reticle surface to intercept the high-resolution image and is configured to be slewed to the desired point in a scene of the high-resolution image.

18. An apparatus for spatial modulation imaging (SMI) including a high-resolution collecting optic, a spatial modulation reticle located in a high-resolution image plane of the collecting optic, the reticle moving in the image plane, a demagnifying relay optic and a primary small-format focal plane array (FPA) detector located in the demagnified image plane, the apparatus further comprising:
a foveal enhanced imaging (FEI) mechanism having an amplitude beamsplitter located either (a) just before or (b) after the reticle moving plane, to split off a fraction of a high-resolution image intensity; and
a spectral bandwidth or polarization component, for retaining the high-resolution image by routing it to a shared portion of the primary FPA.

19. The apparatus as set forth in claim 18 further comprising a secondary optical path that leads from the beamsplitter through a 1:1 magnification optic to the shared portion of the primary FPA.

20. A system for foveal enhanced imaging of a scanned scene in a sensor having a large throughput collection optic and a high-resolution scene image at a reticle plane and a lower-throughput relay optic and low-resolution scene image that follows at a detector, the system comprising:
a mechanism that employs spillover light that is otherwise lost in a transition from the large throughput collection optic and high resolution scene image at the reticle plane to the lower throughput relay optic and low resolution scene image that follows at the detector plane.

21. The system as set forth in claim 20 wherein the mechanism includes one of either a large-diameter folding mirror with a hole in center for capturing the spillover light, or a dichroic beamsplitter with an appropriately transmitting center area, so as to pass the light passing through an acceptance aperture of the relay optic while reflecting to the side all the light that falls outside the acceptance aperture of the relay optic, and a slewable relay mirror that refocuses the otherwise-lost light onto a second FPA to display a foveal enhanced image of a selected subarea of the scene.

* * * * *